United States Patent [19]

Jordan

[11] 4,317,338

[45] Mar. 2, 1982

[54] UNIVERSAL JOINT

[75] Inventor: David D. Jordan, South Bend, Ind.

[73] Assignee: The Bendix Corporation, Southfield, Mich.

[21] Appl. No.: 73,974

[22] Filed: Sep. 10, 1979

[51] Int. Cl.³ .............................................. F16D 3/02
[52] U.S. Cl. ........................................ 64/7; 403/131; 308/72
[58] Field of Search ............... 64/7, 6, 11 R; 403/128, 403/129, 130, 131; 308/72

[56] References Cited

U.S. PATENT DOCUMENTS

| 1,368,607 | 2/1921 | Cooper | 64/7 |
| 2,460,361 | 2/1949 | Petho | 64/7 |
| 2,960,341 | 11/1960 | Emrick | 64/7 |
| 3,217,515 | 11/1965 | Benson | 64/7 |
| 3,229,481 | 1/1966 | Dunn | 64/7 |
| 3,431,751 | 3/1969 | Stokely | 64/7 |

FOREIGN PATENT DOCUMENTS

| 284462 | 2/1928 | United Kingdom | 64/7 |
| 313680 | 6/1929 | United Kingdom | 64/7 |
| 469711 | 7/1937 | United Kingdom | 64/7 |

Primary Examiner—Ira S. Lazarus
Assistant Examiner—Magdalen Moy
Attorney, Agent, or Firm—Leo H. McCormick, Jr.; Ken C. Decker

[57] ABSTRACT

A universal joint for connecting a pair of elongated members is disclosed. The joint provides for transmission of torque between the pair of members when the pair of members are oriented at various angles relative to each other. One of the members terminates in a cavity, or housing, which is substantially cylindrical. The other member extends into the cavity and a pair of sockets cooperate with the other member to secure the latter within the cavity. The pair of sockets include outer surfaces which substantially match with the cylindrical cavity surface to enable the pair of sockets to rotate in a plane relative to the one member. The pair of sockets include projections which are received in an opening on the other member to enable the other member to pivot relative to the pair of sockets and the one member in substantially perpendicular plane. At least one of the sockets is shiftable in a direction along the major axis of the member receiving the projections in order to reduce the maximum dimension of the pair of sockets and the member to permit the pair of sockets and the member to be accommodated within the housing. When accommodated within the housing, the socket is shiftable into its operative position wherein both sockets substantially engage the wall of the cavity. The shiftable socket includes a locking member opening designed to accommodate a locking member for locking the socket with respect to the other member when the socket is in its operative position with respect to the other member.

13 Claims, 7 Drawing Figures

UNIVERSAL JOINT

BACKGROUND OF THE INVENTION

A steering shaft assembly includes a first member coupled to a steering wheel and a second member coupled to a steering gear. A universal joint between the first and second members provides for an angular orientation between the members as the steering wheel is positioned to accommodate a vehicle operator and the steering gear is positioned to accommodate space within an engine compartment.

In copending U.S. patent application Ser. No. 54,365, filed on July 2, 1979, (hereinafter sometimes referred to as the "copending application") and now U.S. Pat. No. 4,274,268 a universal joint for a pair of members is described. One of the members terminates in a cavity defining a housing for receiving a portion of the other member. A pair of sockets are rotatably disposed within the cavity to provide for rotation of the sockets in a first plane relative to the one member. The pair of sockets cooperate with the other member to pivotally support the latter for pivotal movement in a second plane substantially perpendicular, or orthogonal, to the first plane. At least one spring clip disposed between the other member and one of the pair of sockets biases the pair of sockets into engagement with the wall of the cavity. The one spring clip maintains the pair of sockets in an expanded position to prevent withdrawal of the other member and the pair of sockets from the cavity.

The present invention is an improved universal joint for joining a pair of members similar to those described in the copending application.

SUMMARY OF THE INVENTION

The invention herein provides for a universal joint for a pair of members that transmit torque therebetween. The pair of members are substantially similar to the pair of members described in the copending application, incorporated by reference herein. As in the copending application, a pair of sockets interconnect the pair of members for relative rotation in perpendicular, or orthogonal, planes. Each socket includes a cylinder outer surface which mates with partial cylindrical walls of one of the members. Each of the sockets include projections for accommodation within an opening, or receptacle, in the other member. At least one of the sockets is shiftable with respect to the other member, in a direction along the major axis of the other member, to a position where the other member and the pair of sockets can be inserted into the cavity of the one member. After insertion the socket is then shiftable into its operative position and releasably locked into place. No spring clips are required in the present invention to assemble the universal joint.

It is a primary object of the present invention to provide a universal joint with minimum parts that is economical to manufacture and assemble.

It is another object of the present invention to provide a pair of members with a universal joint therebetween that are capable of withstanding great high torque forces as well as minimizing the possibility of accidental dissassembly when in operation. The assembly and disassembly of the present invention does not require the use of spring clips to permit accommodation of one member and the sockets into the cavity of the other member.

It is a further object of the invention to provide a pair of members with a universal joint therebetween having a pair of sockets that sandwich an end portion of one member, are accommodated in a cavity of the other member, and provide a locking element to lock the sockets together, thus preventing relative wobbling of the sockets.

DETAILED DESCRIPTION OF THE DRAWINGS

Figure 1:
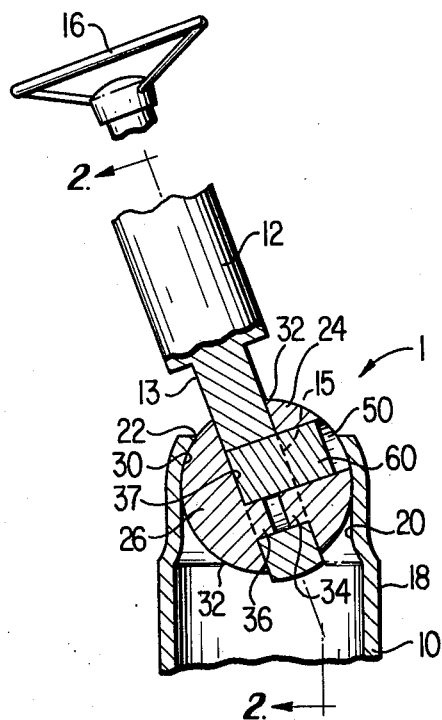
FIG. 1 is a cross-sectional view of a pair of members having a universal joint therebetween in accordance with the present invention.
Figure 2:
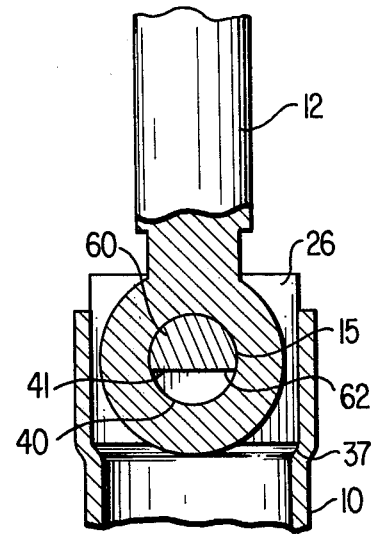
FIG. 2 is a cross-sectional view taken along line 2—2 of FIG. 1.

The invention relates to a universal joint 1 for a pair of members 10, 12. The one member 10 can be coupled to a steering gear (not shown) while the other member 12 can be coupled to a steering wheel 16. The one member 10 forms a tubular end 18 terminating in a cylindrically shaped cavity 20. An opening 22 receives the other member 12 and a pair of sockets 24 and 26. The inner wall 30 of cavity 20 and the outer surface 32 of the pair of sockets are substantially cylindrical in shape. Rotation of steering wheel 16 imparts torque to member 12 which is coupled to member 10 for rotation with member 12. Thus, member 10 rotates in a first plane substantially perpendicular to the major axis of member 10. Member 12 is rotatable, along with sockets 24 and 26, relative to member 10 in a second plane perpendicular to the first plane (i.e., in the plane of the drawing). Further, member 12 is rotatable in a third plane about the projections 34 and 36, the third plane perpendicular, or orthogonal, to each of the first and second planes.

Figure 5:
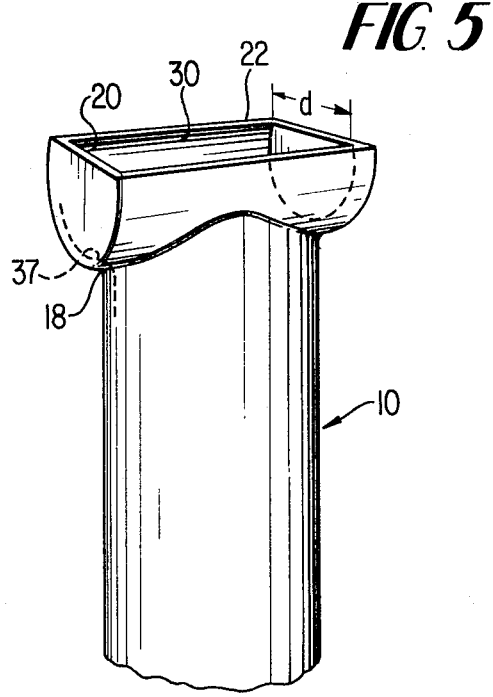
FIG. 5 is a perspective view of one member.

Each of the members 10, 12 are elongated, columnar-shaped members having major axes substantially greater than their minor axes. Member 10 defines a cylindrically-shaped cavity 20 at one end to form a housing for receiving and accommodating the end portion of member 12 along with sockets 24 and 26, in a manner to be described. The cylindrically shaped cavity has an opening 22 defined by an open segment of a cylinder. The opening 22 is substantially rectangular in top view, as shown in FIG. 5. The width d of the opening is less than the inner diameter D of the cylindrical cavity in order to retain the sockets 24, 26 and the other member 12 therewithin.

A shoulder 37 formed on the member 10 opposes the pair of sockets 24 and 26 to prevent the latter from extending completely within the member 10. The shoulder is curved to support the pair of sockets evenly over their lower surface edges.

The cavity 20, or housing, walls are rigid and unyieldable, preferably made of steel.

The other member 12 is in the form of a cylindrical rod having a flattened end portion 13 and a cylindrical bore 15, or eye, extending between the flattened end faces. The bore defines a receptacle opening for receiving projections of the sockets.

The sockets 24, 26 each have a cylindrical outer surface 32 having a radius of curvature substantially equal to the radius of curvature of the inner wall 30 of the cavity 20. The sockets 24, 26 are essentially segments of a cylinder. In the embodiment of FIGS. 1-4, D-shaped projections 34, 36 project from the planar faces 35, 37 of both sockets. The curved portion 40 of each D-shaped projection has a radius of curvature substantially equal to the radius of curvature of the bore 15 of the other member 12. The height of the projections 34, 36 from the planar faces 35, 37 is preferably less than half the length of the bore 15.

The sockets 24, 26 are preferably made from a thermoplastic material, such as a glass reinforced polyphenylene, to provide inherent lubrication between the sockets and the wall 30 of the cavity 20. As will be apparent to one of ordinary skill in the art, other materials can be employed, such as sintered iron.

The socket 24 defines a substantially D-shaped opening 50 extending entirely therethrough. The radius of curvature of the D-shaped opening 50 is substantially equal to the radius of the curvature of the bore 15 of the member 12. In the assembled position, as shown in FIG. 1, the D-shaped opening 50 is aligned and in communication with the bore 15.

A D-shaped pin 60 is provided as a locking member for insertion through the socket opening 50 and into the bore 15. The radius of curvature of the D-shaped pin is substantially equal to that of the socket opening 50 and the bore 15 and insertable therewithin. When the pin 60 is inserted through the socket opening 50, a flat face 62 of the pin 60 mates with a flat face 41 of projections 24, 26 to form a cylindrical boss about which the end portion 13 of the other member 12 is rotatable.

In the embodiment of FIGS. 1-4, the D-shaped pin 60 extends entirely through the bore 15 of the other member 12, abutting the planar face 37 of socket 26. Thus, sockets 24 and 26 are locked with respect to each other as well as to member 12. Should socket 24 tend to wobble or rotate in the above-described third plane, due to slight tolerances that might occur between the cylindrical surface of the socket and the cylindrical cavity, the pin 60 will tend to prevent relative wobbling or rotation between sockets 24, 26.

Figure 6:
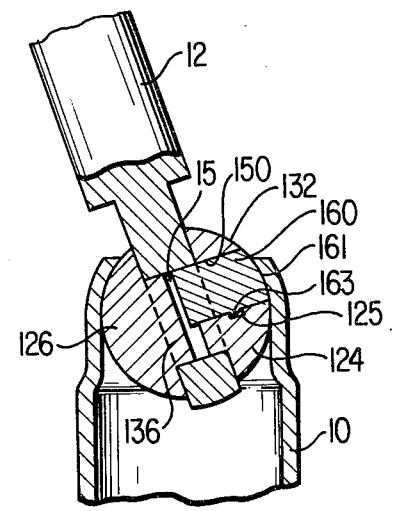
FIG. 6 is a cross-sectional view of an alternate embodiment.

In the embodiment of FIG. 6, socket 126 has a cylindrical projection 136 of substantially the same diameter as the bore 15 of the other member 12. In this embodiment, D-shaped pin 160 does not lock the two sockets 124, 126 together. The D-shaped pin 160 of this embodiment has a cylindrically contoured face 161 for flush engagement with the cylindrical surface 132 of socket 124.

Snap-in action of the D-shaped pin 160 with respect to the socket 124 can also be provided. This snap-in action can be provided by a resilient, or retractable member 163 integral, or securable, with the pin 160 that is yieldable or retractable during the insertion of the D-shaped pin 160 within the socket 124, and expandable to engage a recess 125 in the D-shaped socket opening 150. Other locking arrangements for retaining the pin within the socket opening should be apparent to one of ordinary skill in the art. Such snap-in arrangements can also be used with the embodiment of FIGS. 1-4.

Figure 7:
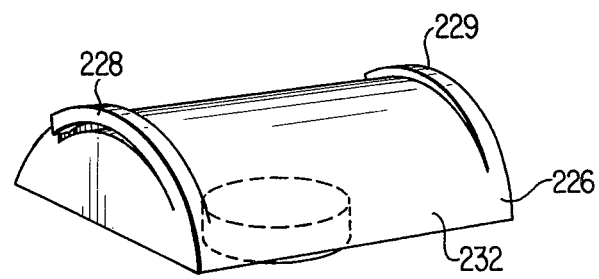
FIG. 7 is a perspective view of an alternate socket member.

FIG. 7 depicts a socket 226 providing for spring loading of the socket 226 within the cavity 20. Spring tabs 228, 229 are formed unitary with the socket 226 and biassed radially outward from the curved surface 232 of the socket, as well as biassed longitudinally along the major cylindrical axis of the socket. This spring bias arrangement can take up any lash or wobble that may occur about the major axis of member 10, as well as reducing any noise due to vibration. Either or both of the sockets may be formed with such spring tabs. Alternatively, rotational lash or noise may be reduced by inserting a separate spring member, such as belleville washer between one or both of the sockets and the member 12 similar to that shown in the co-pending application.

Figure 3:
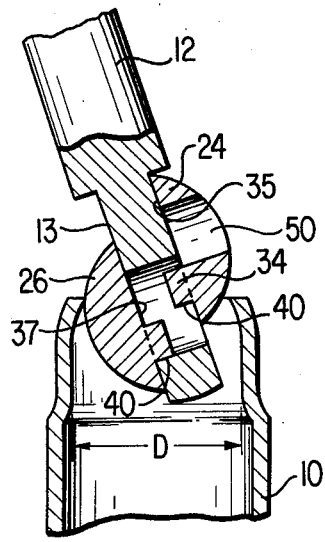
FIG. 3 is a cross-sectional view of the universal joint with one socket shifted for insertion.
Figure 4:
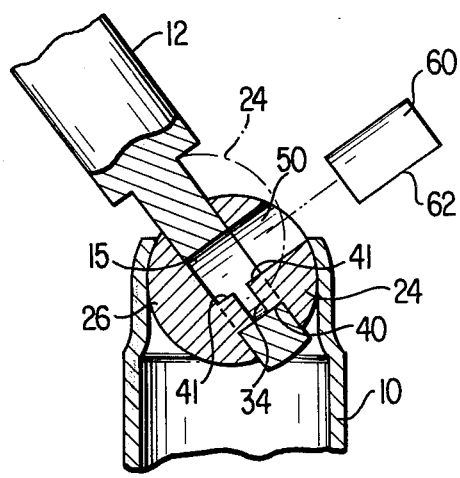
FIG. 4 is a cross-sectional view of the universal joint with the sockets in their operative position for receiving the D-shaped pin.

The method of assembly will now be described. Socket 26 is assembled onto the end portion 13 of the other member 12. In the embodiment of FIGS. 1-4, the socket 26 is capable of movement within the bore 15 of the member 12. Thus, in this embodiment, it is necessary to position the socket 26 in its operative position, i.e., the cylindrical surface 40 of the projection 36 is engaging the cylindrical bore 15 of the other member 12. The socket 24 is then positioned to sandwich the end portion 13 of the other member 12 between the sockets. As shown in FIG. 3, the socket 24 is at a first position displaced along the major axis of the other member 12. At this first position, with the member 12 angularly oriented with respect to the member 10 as shown in FIG. 3, the maximum dimension across the pair of sockets and the member 12 is less than, or just equal to, the dimension d of the opening 22 of the cavity 20. This permits the pair of sockets 24, 26 and the end portion of the member 12 to be accommodated within the cavity 20 through the cavity opening 22. When the two sockets 24, 26 and the end portion 13 of the member 12 are accommodated within the housing cavity as shown in FIG. 4, the socket 24 is shifted in a direction along the major axis of the member 12 into a second position, defined by the mating of the curved portion 40 of the D-shaped projection 34 of the socket 24 with the cylindrical surface of the bore 15. At this second position, the cylindrical surface 32 of the socket 24 engages the inner cylindrical surface 30 of the cavity 20. The D-shaped pin 60 is then inserted through the socket opening 50 of the socket 24, which at the second position is in alignment with the bore 15. In the embodiment of FIGS. 1-4, the D-shaped pin 60 extends entirely through the bore 15 such that its end face abuts the planar face 37 of socket 26, thus locking sockets 24 and 26 together.

When the joint is to be disassembled, pin 60 is removed from the socket opening, the socket 24 is shifted back to its first position such that the maximum transverse dimension of the two sockets and the member 12 are less than or equal to the cavity opening dimension d, and the sockets and member 12 are removed from the housing.

As is apparent from the above method, it is essential that the D-shaped projection 34 of socket 24 be of a configuration to permit its shiftable longitudinal movement within the bore 15 of the member 12. That is, the D-shaped projection 34 must be less than a semi-circular cross-sectional configuration. The D-shaped projection 24 will thus be movable within the bore 15 a distance that is twice the distance between the center line of the bore 15 and the flat face 41 of the D-shaped projection 34. Sufficient movement must be provided such that when the member 12 is anlged the maximum amount from the major axis of the member 10, the socket 24 can be shifted within the bore 15 a sufficient distance such that the maximum dimension across the pair of sockets and the member 10, in a plane substantially parallel to the housing opening 22, is less than, or just equal to the housing opening dimension d.

Above, specific embodiments of the present invention have been described. It should be appreciated, however, that these embodiments were described for purposes of illustrations only, without any intention of limiting the scope of the present invention. Rather, it is the intention of the present invention to be limited not by the above, but only as is defined in the appended claims.

What is claimed is:

1. In a joint for connecting a pair of members, one of said members defining a cavity, the other of said members defining a receptacle having a cylindrical bore, a pair of sockets within said cavity, each socket including projections which are received within said receptacle to permit relative rotation between said pair of members in orthogonal planes, the improvement comprising one of said pair of sockets defining an opening, said projection on said one socket being substantially D-shaped wherein the curved portion of said D-shaped projection is circular and complementary with said cylindrical bore, said opening aligned and in communication with said receptacle at a predetermined relative position between said socket and said other member, said opening being substantially D-shaped; and a pin having a substantially D-shaped cross-sectional configuration substantially identical to the cross-sectional configuration of said opening, extending through said opening and into said receptacle wherein at a predetermined relative position of said one socket and said other member, said D-shaped pin and said D-shaped projection are adjacent to each other to form a cylindrical boss of substantially the same diameter as said cylindrical bore.

2. The joint of claim 1 further comprising snap-fitting means for snap-fitting said D-shaped pin within said one socket.

3. The joint of claim 1 wherein said cavity defines a cylindrical inner surface and said pair of sockets define cylindrical outer surfaces, the maximum distance between the outer surfaces of said pair of sockets being substantially equal to the diameter of said cylindrical inner surface of said cavity.

4. The joint of claim 3 wherein the cylindrical outer surface of one of said pair of sockets defines spring biassing means for reducing wobble between the socket and the cavity.

5. The joint of claim 4 wherein said spring biassing means comprises a pair of spring tabs each extending radially outward from the cylindrical outer surface of the socket.

6. The joint of claim 1 wherein the projection of said other socket is substantially D-shaped and substantially the same size as the D-shaped projection of said one socket.

7. The joint of claim 1 wherein the projection of said other socket is substantially cylindrically shaped having a diameter substantially equal to the diameter of said cylindrical bore.

8. A universal joint comprising a pair of elongated members, each defining major axes, rotatable together in a first plane of rotation substantially perpendicular to the major axis of one of said members, the other member rotatable with respect to said one member in orthogonal planes, said one member defining a housing for accommodating an end portion of said other member, said housing defining a housing opening, said end portion of said other member defining receptacle means for receiving socket projections, a pair of sockets, each having a socket projection accommodated within the receptacle means, shifting means for permitting one socket to be shifted between a first position and a second position with respect to said end portion of said other member, wherein in said first position, the pair of sockets and said end portion are capable of passing through the housing opening, and in said second position, said pair of sockets and said end portion are not capable of passing through the housing opening, said shifting means comprises said receptacle defined by a cylindrical bore, and said one socket projection defined by a D-shaped protrusion wherein said D-shaped protrusion is shiftable between said first and second positions within said cylindrical bore; and locking means for locking said one socket to said end portion in said second position.

9. The universal joint of claim 8 wherein said locking means comprises a D-shaped pin and a complementary D-shaped opening defined by said one socket, wherein said D-shaped pin is insertable through said D-shaped opening and into said receptacle for releasably locking said one socket to said end portion of said other member at said second position.

10. The universal joint of claim 9 wherein said D-shaped pin engages said other socket to lock said pair of sockets together.

11. The universal joint of claim 8 wherein in said first position, the maximum dimension of said pair of sockets and said end portion, in a plane parallel to said housing opening, is less than the dimension of said housing opening.

12. The universal joint of claim 11 wherein in said second position, the maximum dimension of said pair of sockets and said end portion, in a palne parallel to said housing opening, is greater than the dimension of said housing opening.

13. The universal joint of claim 8 wherein said shifting means permits said one socket to be shifted between a first and second position in a direction substantially parallel to the major axis of said other member.

* * * * *